United States Patent [19]

Jülke

[11] 4,350,468
[45] Sep. 21, 1982

[54] HIGH-RISE SILOS

[75] Inventor: Bernhard Jülke, Melle, Fed. Rep. of Germany

[73] Assignee: Engelbrecht & Lemmerbrock GmbH & Co., Melle, Fed. Rep. of Germany

[21] Appl. No.: 222,283

[22] Filed: Jan. 5, 1981

[30] Foreign Application Priority Data

Jan. 17, 1980 [DE] Fed. Rep. of Germany ... 8001051[U]

[51] Int. Cl.³ ..................... B65G 65/36; F16L 25/00
[52] U.S. Cl. ................................ 414/325; 285/331; 414/317
[58] Field of Search ............... 414/317, 304, 325; 277/207 A, DIG. 12; 285/331, 332.2, 343

[56] References Cited

U.S. PATENT DOCUMENTS 772,956 10/1904 Patterson .......................... 414/317
2,500,043 3/1950 Radtke ......................... 414/317 X Primary Examiner—Robert G. Sheridan
Attorney, Agent, or Firm—Balogh, Osann, Kramer, Dvorak, Genova & Traub

[57] ABSTRACT

A high-rise silo in which silage is fed radially by means of revolving feed members to a central vertical clearing shaft of the silo. The silage is withdrawn from the shaft at the bottom. The shaft itself is assembled from separate cylindrical pipe lengths each of which has an internal encircling groove with a sealing ring at the upper end, into which engages an internal co-axial annular flange situated at the lower end of the superjacent cylindrical pipe length, in sealing manner.

2 Claims, 3 Drawing Figures

HIGH-RISE SILOS

BACKGROUND OF THE INVENTION

The present invention relates to high-rise silos of the kind having a central vertical clearing shaft comprising a plurality of similar pipe sections arranged loosely on above another, to the top of which shaft silage is fed by means of revolving feed members, and is drawn off outwards radially below the silo bottom by means of a conveyor. Hereinafter, such silos will be referred to as "of the kind described".

Silos of this known nature the kind described, as exemplified by French Pat. No. 1,214,842, are often erected in smaller agricultural undertakings, for which costly pneumatic clearing devices cannot be economically utilised. The central vertical clearing shaft of such known silos is assembled from pipe sections fitted or mounted loosely one above another, the top pipe stack being pulled out upwards in each case whilst drawing from the silo, to ensure that the silage is fed to the clearing shaft in an approximately horizontal direction.

It is an object of the invention to secure adequate and efficient sealing of the shaft at the joints of the pipe sections against the surrounding silage, to preclude post-fermentation actions caused by air admission and furthermore also to simplify the shaft structure.

SUMMARY OF THE INVENTION

To accomplish this and other objectss, in a silo of the kind described, each pipe section has an inner annular cylindrical flange which is spaced from the lower end of the pipe wall, and is hermetically connected to the pipe wall and projects axially beyond the lower rim of the pipe section, and the upper part of the section having an inner encircling annular groove provided with a sealing ring the bottom of said sealing ring being spaced from the upper rim of the pipe section by an amount which does not exceed the axial length of said annular flange which projects beyond the lower rim of the section.

As a result of this arrangement, the pipe sections forming the clearing shaft cannot be displaced sideways, since the end of the downwardy projecting inner annular cylindrical flange of each superjacent pipe section engages in the upper end of the pipe section subjacently situated in each case, whereby the pipe sections are also aligned automatically. Upon insertion of the annular cylindrical flange into the upper extremity of the subjacently situated pipe section, the lower rim of the annular flange is also placed on the bottom of the annular groove of the lower pipe section, on the sealing ring laid in the groove, thereby preventing any air within the clearing shaft from coming into contact with the silage. A post-fermentation of the silage at the joints of the pipe sections cannot therefore occur. Complementarily, the lower end of the clearing shaft may be closed off hermetically by means of a flap.

BRIEF DESCRIPTION OF THE DRAWINGS

In order that the invention may be more clearly understood, reference will now be made to the accompanying drawings which show one embodiment thereof by way of example and in which.

DETAILED DESCRIPTION OF PREFERRED EMBODIMENT

Figure 1:
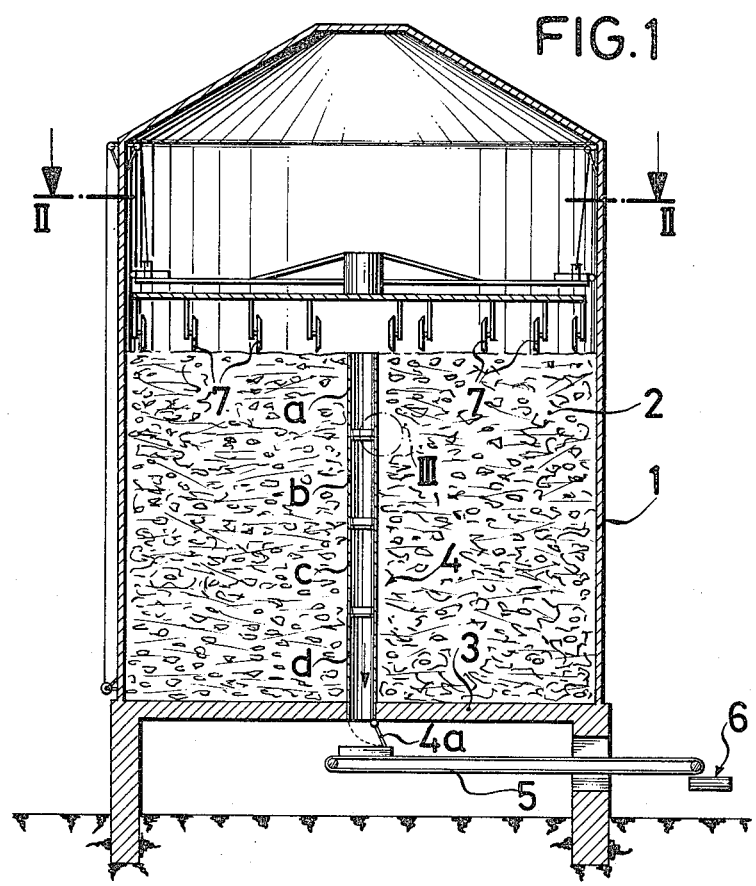
FIG. 1 shows a diagrammatical axial section through a high-rise silo having a clearing shaft in accordance with the invention.
Figure 2:
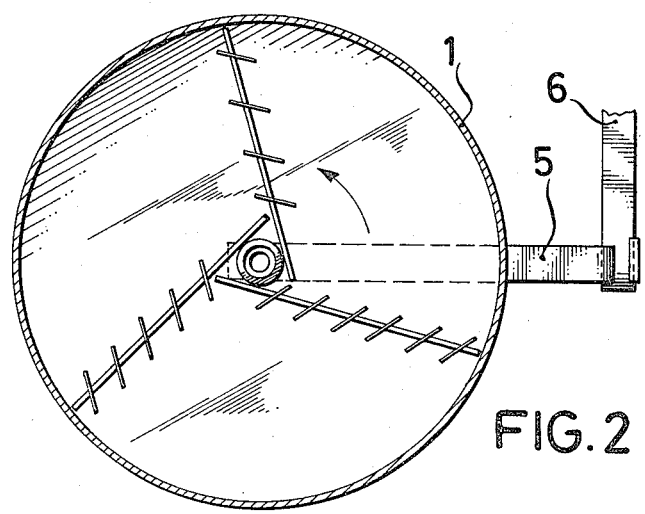
FIG. 2 shows a cross-section along the line II—II of FIG. 1.

Referring now to the drawings, a high-rise silo in accordance with the embodiment shown comprises a cylindrical casing 1 closed at the top and intended to receive silage-forming agricultural stalk and leaf materials 2 which are supplied to the silo, for example by any means usual in this art such as pneumatic means. Prior to the infeed of the silage material, the base 3 which is provided with a central opening has a clearing shaft 4 assembled thereon which is built up of pipe sections a-d, said opening being hermetically closable at the bottom by means of a flap 4a. Below the base 3 is installed a conveyor 5 which conveys the silage outwards radially to another conveying device 6 and to another station in the complete plant. Above the silage-forming material 2 fed in, conveying member 7 of any known or desired kind are arranged on rotarily driven arss, whereby the silage is taken off by layers from the top towards the bottom and fed to the open upper end of the clearing shaft 4, the then uppermost pipe section of the shaft being removed upwards as required, to assure a substantially horizontal feed of silage to the clearing shaft. The silage drops downwards within the shaft and on to the conveyor 5, whereby it is removed outwards radially and carried onwards by the conveying device 6 as previously referred to.

Figure 3:
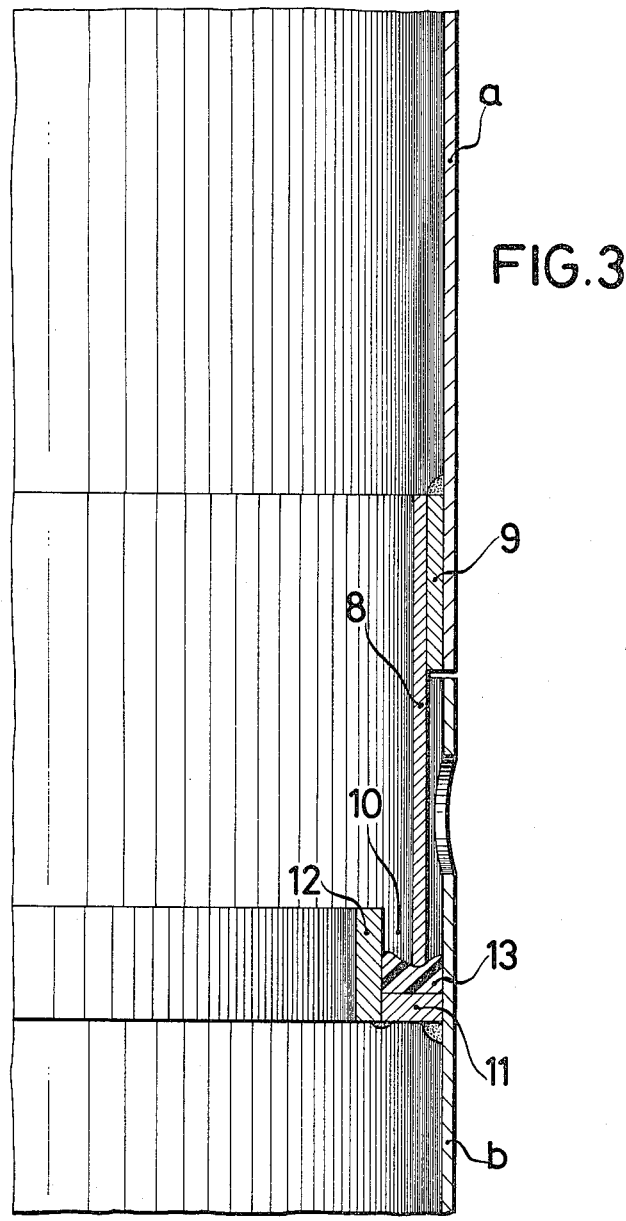
FIG. 3 shows the encircled part III of FIG. 1 to a much larger scale.

In accordance with the invention, and as shown more clearly in FIG. 3 each of the pipe sections a-d is provided at its lower end with an inner annular cylindrical flange 8 which is spaced slightly away from the inner wall surface by a spacing ring 9 e.g. as illustrated in pipe section a shown the flange 8, projecting beyond the lower rim of pipe section a. Furthermore, each pipe section is provided at its upper end with an inner annular groove 10 formed by rings 11 and 12, the ring 11 being welded to the wall, and the ring 12 being welded to the ring 11 for example. A sealing ring 13 advantageously formed from a soft resilient material, e.g. an expanded substance, is laid in the annular groove 10. The bottom of each annular groove 11 and sealing ring 13, is spaced some distance from the top rim of its respective pipe section this distance being a little less than the length with which the annular cylindrical flange 8 projects beyond the lower rim of superjacent pipe section in each case. It will be understood that the upper end of pipe section a is not shown in FIG. 3.

When each pipe section is located on its lower pipe section, the lower rim of the annular flange 8 is borne on the sealing ring 13 within the annular groove 10, a good seal of the clearing shaft 4 against the surrounding silage thereby being obtained at the joint between two pipe sections. The engagement of the annular flange 8 in the upper end of the pipe section situated below the same in each case simplifies the assembling of the shaft 4 and also results in centring of the pipe sections and moreover prevents a lateral displacement of the pipe sections.

I claim:

1. A high-rise silo having a central vertical clearing shaft comprising a plurality of similar pipe sections arranged loosely one above another, to the top of which shaft silage is fed by means of revolving feed members, and is drawn off outwards radially below the silo bottom by means of a conveyor, wherein each pipe section has an inner annular cylindrical flange which is spaced from the lower end of the pipe wall and is hermetically connected to the pipe wall and projects axially beyond the lower rim of the pipe section, and the upper part of the section having an inner encircling annular groove provided with a sealing ring the bottom of said sealing ring being spaced from the upper rim of the pipe section by an amount which does not exceed the axial length of said annular flange which projects beyond the lower rim of the section.

2. A high-rise silo according to claim 1, wherein a hermetically closable flap is provided and arranged to close off the bottom outlet of the clearing shaft.

* * * * *